(12) United States Patent
Wyss et al.

(10) Patent No.: US 9,628,141 B2
(45) Date of Patent: Apr. 18, 2017

(54) SYSTEM AND METHOD FOR ACOUSTIC ECHO CANCELLATION

(71) Applicant: Interactive Intelligence, Inc., Indianapolis, IN (US)

(72) Inventors: Felix Immanuel Wyss, Zionsville, IN (US); Rivarol Vergin, Indianapolis, IN (US); Ananth Nagaraja Iyer, Carmel, IN (US); Aravind Ganapathiraju, Hyderabad (IN); Kevin Charles Vlack, Ballwin, MO (US); Srinath Cheluvaraja, Carmel, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 399 days.

(21) Appl. No.: 14/060,141

(22) Filed: Oct. 22, 2013

(65) Prior Publication Data
US 2014/0112467 A1 Apr. 24, 2014

Related U.S. Application Data

(60) Provisional application No. 61/717,156, filed on Oct. 23, 2012.

(51) Int. Cl.
*H04B 3/23* (2006.01)
*H04M 9/08* (2006.01)

(52) U.S. Cl.
CPC ............ *H04B 3/234* (2013.01); *H04B 3/23* (2013.01); *H04M 9/082* (2013.01)

(58) Field of Classification Search
None
See application file for complete search history.

(56) References Cited

U.S. PATENT DOCUMENTS

| | | | |
|---|---|---|---|
| 5,450,484 A * | 9/1995 | Hamilton | G10L 25/78 379/351 |
| 6,249,581 B1 * | 6/2001 | Kok | H04M 9/082 379/406.16 |
| 6,792,107 B2 | 9/2004 | Tucker et al. | |
| 6,842,516 B1 | 1/2005 | Armbruster | |
| 7,236,929 B2 * | 6/2007 | Hodges | G10L 25/78 215/226 |
| 7,684,982 B2 * | 3/2010 | Taneda | G10L 15/25 379/392.01 |

(Continued)

OTHER PUBLICATIONS

International Search Report issued in related International Application PCT/US13/66144 (Filing date Oct. 22, 2013). Mailed Feb. 28, 2014.

(Continued)

*Primary Examiner* — Fan Tsang
*Assistant Examiner* — Jeffrey Lytle

(57) ABSTRACT

A system and method are presented for acoustic echo cancellation. The echo canceller performs reduction of acoustic and hybrid echoes which may arise in a situation such as a long-distance conference call with multiple speakers in varying environments, for example. Echo cancellation, in at least one embodiment, may be based on similarity measurement, statistical determination of echo cancellation parameters from historical values, frequency domain operation, double talk detection, packet loss detection, signal detection, and noise subtraction.

55 Claims, 10 Drawing Sheets

(56) References Cited

U.S. PATENT DOCUMENTS

| | | | |
|---|---|---|---|
| 7,792,281 B1 | 9/2010 | Zad-Issa et al. | |
| 7,852,950 B2 | 12/2010 | Sedarat | |
| 7,856,098 B1 | 12/2010 | Rossello | |
| 2003/0223382 A1* | 12/2003 | Popovic | H04B 3/23 370/286 |
| 2004/0042616 A1 | 3/2004 | Matsuo | |
| 2006/0147029 A1 | 7/2006 | Stokes, III et al. | |
| 2007/0058798 A1 | 3/2007 | Takada | |
| 2007/0280473 A1 | 12/2007 | Suzuki et al. | |
| 2008/0247559 A1* | 10/2008 | Wang | H04B 3/234 381/66 |
| 2009/0010445 A1 | 1/2009 | Matsuo | |
| 2009/0296610 A1 | 12/2009 | Bugenhagen | |
| 2010/0226491 A1 | 9/2010 | Conte et al. | |
| 2010/0226492 A1 | 9/2010 | Takada | |
| 2010/0278067 A1 | 11/2010 | LeBlanc | |
| 2011/0013766 A1 | 1/2011 | Dyba et al. | |
| 2012/0201370 A1* | 8/2012 | Mazurenko | H04B 3/23 379/406.1 |

OTHER PUBLICATIONS

Supplementary European Search Report issued in related European Application EP 13 84 9528, originally filed under PCT as International Application PCT/US13/66144 (Filing date Oct. 22, 2013). Mailed May 12, 2016.

Australian Search Report issued in related Australian Application AU2013334829, originally filed under PCT as International Application PCT/US13/66144 (Filing date Oct. 22, 2013). Mailed May 12, 2016.

* cited by examiner

SYSTEM AND METHOD FOR ACOUSTIC ECHO CANCELLATION

BACKGROUND

The present invention generally relates to telecommunication systems and methods, as well as communication networks. More particularly, the present invention pertains to the elimination of echo over communication networks.

SUMMARY

A system and method are presented for acoustic echo cancellation. The echo canceller performs reduction of acoustic and hybrid echoes which may arise in a situation such as a long-distance conference call with multiple speakers in varying environments, for example. Echo cancellation, in at least one embodiment, may be based on similarity measurement, statistical determination of echo cancellation parameters from historical values, frequency domain operation, double talk detection, packet loss detection, signal detection, and noise subtraction.

In one embodiment, a system for cancellation of acoustic echo is described, comprising: a source of audio input, wherein the source of audio input is capable of generating an audio signal; a network, wherein the network is connected to the source and to an echo cancellation module, wherein the network is capable of transmitting said audio signal; and the echo cancellation module, wherein the module is capable of: converting the audio signal into a frequency domain, performing similarity measure, performing delay estimation, performing echo parameter estimation, performing statistical echo validation, detecting speech, and detecting double-talk.

In another embodiment, a method for acoustic echo cancellation is described, comprising the steps of: initializing echo model parameters; analyzing an audio signal for speech; determining if speech has been detected in said audio signal, wherein if speech has not been detected in said audio signal, continuing to analyze said audio for speech; estimating echo delay in said audio signal and validating said echo model for said audio signal if speech has been detected in said audio signal; determining if echo is present in said audio signal, wherein if echo is not present in said audio signal continuing to analyze said audio signal for speech and repeating the method steps (c)-(e) until echo is present in said audio signal; determining if double talk is present in said audio signal, wherein if double talk is present in said audio signal, determining parameters for echo with double talk and wherein if double talk is not present, computing default parameters for echo; performing echo subtraction on said audio signal; tracking echo in said audio signal and updating said echo model; and, determining if echo is present in said audio signal, wherein: if echo is not present in said audio signal, repeating the method beginning with step (a); and, if echo is present in said audio signal, repeating the method steps (f), (g), (h), and (i), in the order presented.

In another embodiment a system for the cancellation of acoustic echo over communication networks is described, comprising: a source of audio input, wherein the source of audio input is capable of generating an audio signal; a network, wherein the network is connected to the source and to an echo cancellation module, wherein the network is capable of transmitting said audio signal; and the echo cancellation module, wherein the module is capable of: converting the audio signal from a time domain into a frequency domain, performing one or more of: similarity measure, delay estimation, echo parameter estimation, and statistical echo validation, detecting speech, and detecting double-talk.

In another embodiment, a method for acoustic echo cancellation is described, comprising the steps of: transforming an audio signal; initializing echo model parameters; analyzing said audio signal for speech; detecting a presence of speech in the audio signal; estimating echo delay in the audio signal and validating said echo model for the audio signal; detecting the presence of echo in the audio signal; detecting the presence of double talk in the audio signal; determining parameters for at least one of: echo with double talk and echo; subtracting the echo from the audio signal; updating said echo model; and, determining if the presence of echo is reduced in the audio signal.

DETAILED DESCRIPTION

Figure 1:
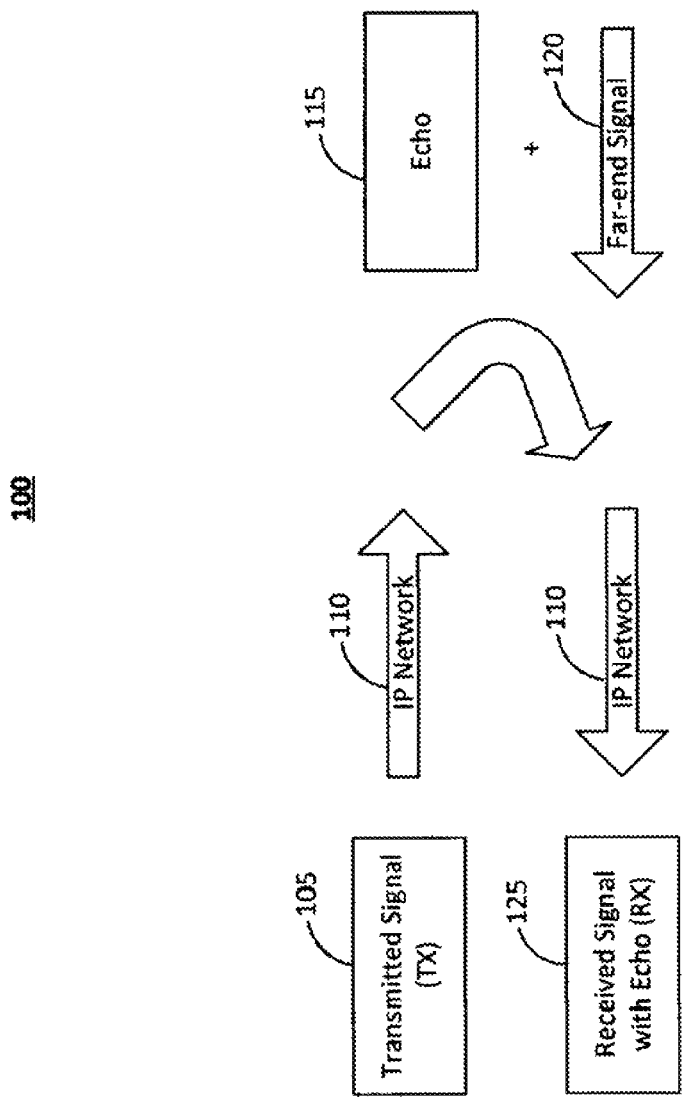
FIG. 1 is a diagram illustrating an embodiment of echo.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The elimination of echo is desired for correctly delivering telephone calls in environments such as in conference calls. The use of hands-free devices during telephone calls, such as conference calls, can give rise to echo. For example, the speech from the far-end caller is emitted by the speakerphone, or the hands-free cellular phone, and then repeats itself by bouncing off of the surfaces of the room. This results in an echo. The echo may then be picked up by a far-end microphone. A feedback loop may be created where the far-end caller hears an echo of their own voice. Delays greater than 1 second (s) have resulted in some situations, such as in conference calls involving international participants.

The failure to remove, or cancel, echo from a call may often result in a significant deterioration of call quality. The varying and uncontrolled nature of acoustic and hybrid environments can result in complex echo patterns such as long delays, time-dependence of echo effects, echo tails, frequency dependent echo, and echo distortion. For example, previous echo cancelling means would typically fail to detect very low level echo that can occur based on the network configuration.

A digital signal processing technique of acoustic echo cancellation may be used to stop feedback and allow for clear communication. Networks, such as VoIP networks, are often noisy with signals suffering minimum to moderate degradation. Means for echo cancellation should operate in the presence of noise. Said means should also be able to account for latency and packet loss effects occurring in these networks. Finally, the operations performed by an echo canceller should be efficient without adding any noticeable delay to the processing of signals.

An echo canceller (EC) may operate as a signal processing operation that eliminates echoes from signals received over communication networks, such as VoIP and public switched telephone networks (PSTNs), or at an endpoint, such as a phone device, for example. Generally, an EC performs reduction of acoustic and hybrid echoes arising in settings such as conference calls with speakers in varying environments. Acoustic echo is generated when a signal transmitted from a near-end speaker is picked up by the far-end speaker's microphone and returns to the near-end speaker as part of the far-end speaker's signal. The terms near-end and far-end are usually defined with respect to the EC under discussion which may be operating at both ends of the communications network. Another source of echo may be the hybrid echo that is a reflection of electrical energy from the far-end due to changes in wiring properties of PSTNs.

Most existing methods of echo cancellation either use time-domain methods or use a cross-correlation of the Discrete Cosine Transform of two signals to determine the delay. In at least one embodiment, EC performs a statistical determination of the effective filter parameters making it more robust in the presence of signal noise and long delays.

Echo cancellation may be carried out in some systems by a dedicated microprocessor, for example, the Texas Instruments TMS320C8x, as the algorithm requires computations in amounts upwards of 10 million instructions per second. On a VoIP network, however, dedicated microprocessors cannot be used because the entire system resides in a server or a computer. In regards to VoIP networks, issues must be considered, for example: whether the VoIP Network adds its own delay on top of normal delay associated with the echo signal, signal compression artifacts introduced by low bitrate codecs which may increase degradation, and the inherent unreliability of IP Networks which may result in packet loss. It is also desirable to handle multiple instances (e.g., hundreds of full-duplex phone calls) of the echo canceller simultaneously on a single server.

Those skilled in the art will recognize from the present disclosure that the various methodologies disclosed herein may be computer implemented using a great many different forms of data processing equipment. Equipment may include digital microprocessors and associated memory for executing appropriate software program(s), to name just one non-limiting example. The specific form of the hardware, firmware and software used to implement the presently disclosed embodiments is not critical to the present invention.

FIG. 1 is a diagram illustrating an embodiment of echo in a communication network indicated generally at 100. An example of a communication network may include, but not be limited to, a VoIP network. The transmitted near-end signal is represented as TX. The received far-end signal with added echo, 125, is represented as RX. The Network 110 through which the far-end signal 120 travels also transmits acoustic echo 115. As the TX 105 travels through the network 110, echo 115 is generated by the far-end speaker's microphone and sent to the near-end speaker as part of the far-end speaker's signal. Double talk may result from the presence of the echo signal in addition to the received far-end speech. Thus, the received signal 125 contains an echo 115.

Figure 2:
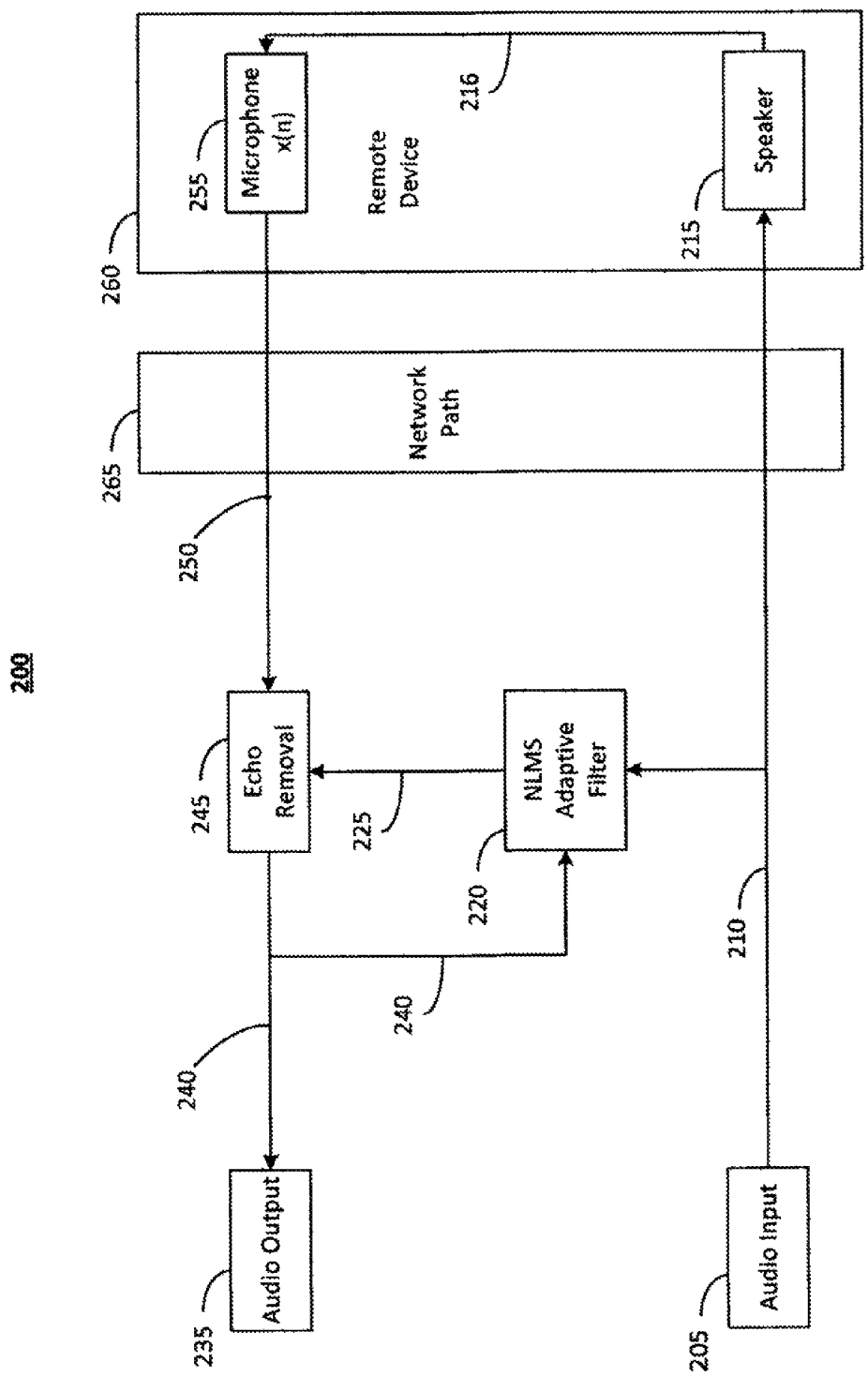
FIG. 2 is a diagram illustrating an embodiment of the operation of an echo canceller system.

FIG. 2 is a diagram illustrating an embodiment of the typical operation of an echo canceller system, indicated generally at 200. The near-end signal 210 may be represented by y(n) while the far-end signal 250 may be represented by x(n)+r(n). The near-end signal 210 may be generated at by audio input 205, an example of which may be a person speaking. The undesired echo 216 may be represented as r(n). The echo canceller uses the transmitted signal y(n), 210, and the received signal x(n)+r(n), 250, to estimate r(n) so that the echo canceller may remove it. The signal may be superimposed with the undesired echo 216 at the microphone x(n) 255 after traveling via the echo path from the speaker 215. A remote device 260 may contain the microphone 255 and the speaker 215. The remote device 260 may produce the echo over the system.

The near-end signal y(n) 210 may be available as a reference signal for the echo canceller 200. It may be used by the echo canceller 200 to generate an estimate of the echo 225, which is represented as $\hat{r}(n)$. The estimated echo is subtracted from the far-end signal plus the echo to yield the transmitted far-end signal 240, u(n), during the echo removal stage 245. Thus, the transmitted far-end signal 240, u(n) can be represented as $u(n)=x(n)+r(n)-\hat{r}(n)$ as the echo estimator, or the NLMS Adaptive Filter 220, as illustrated, needs to see x(n)+r(n) to estimate $\hat{r}(n)$. Ideally, any residual signal, represented as $e(n)=r(n)-\hat{r}(n)$ should be very small or inaudible after echo cancellation as the signal reaches the audio output, 235, an example of which may be a receiver.

The Normalized Least Mean Square (NLMS) adaptive filter 220 may utilize an algorithm that is a variant of the Least Mean Square (LMS) algorithm and may take into account the power of the input signal 210. The LMS algorithm may be an adaptive algorithm that uses a gradient-based method of steepest decent. The adaptive filter adjusts its coefficients to minimize the mean-square error between its output and that of an unknown system. Echo cancellation is performed in the time domain on a sample by sample basis.

Echo delay occurs when the originally transmitted signal reappears in the transmitted or received signal. The echo delay of VoIP networks may become quite large due to various factors. The network path 265 may be an example of one such factor that is responsible for the length of the echo delays. A longer network path 265 may mean a longer echo delay. Delays of more than 1 s have been observed. In a time domain implementation such long echo delays would require the NLMS Filter 220 to have a very large number of taps in order to cancel the echo. Such long filters require a computational effort that is excessively expensive and impractical to estimate.

Figure 3:
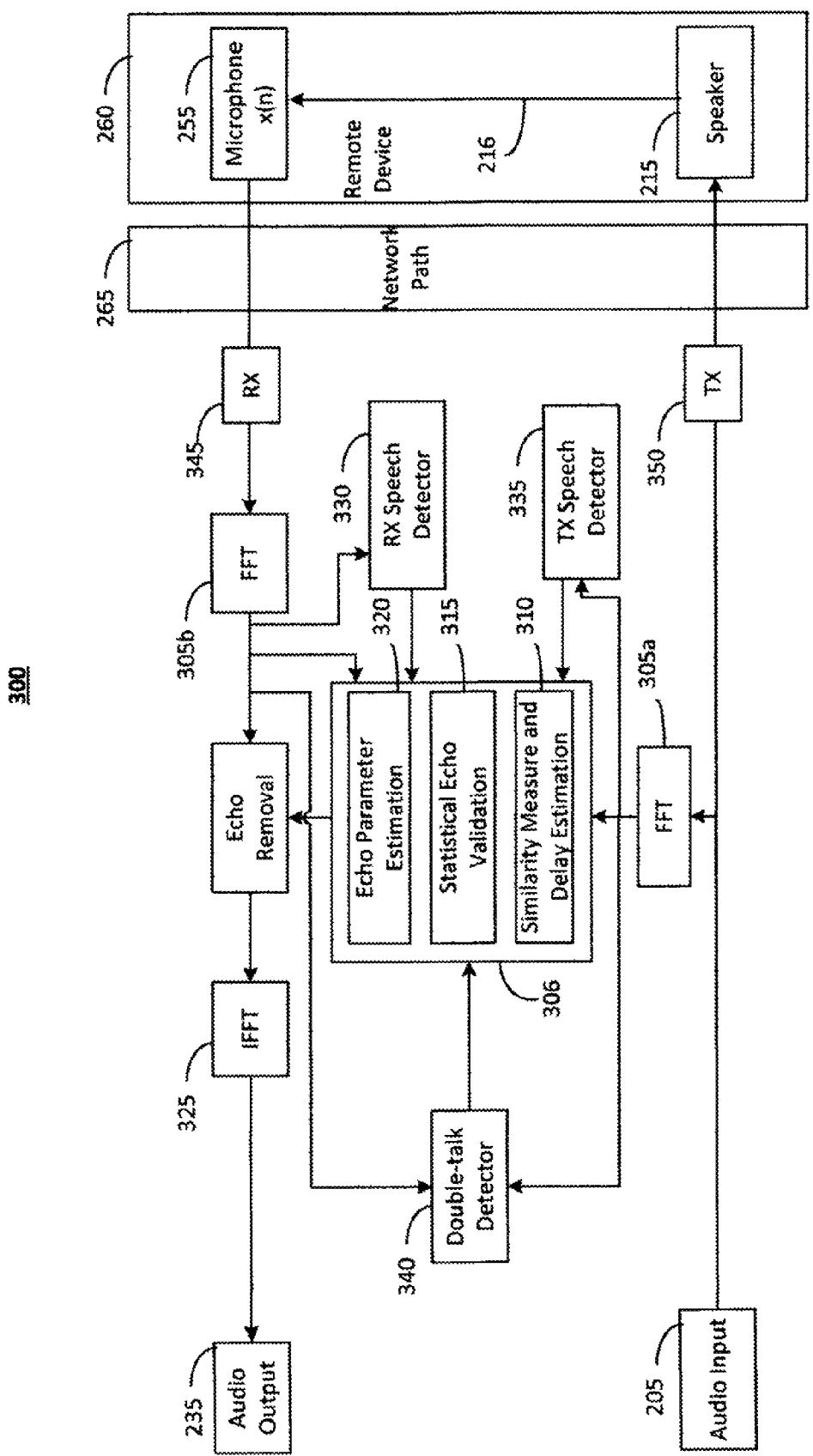
FIG. 3 is a diagram illustrating an embodiment of the operation of a modified echo canceller system.

FIG. 3 is a diagram illustrating an embodiment of the operation of a modified echo canceller system, indicated generally at 300. In this diagram, the NLMS adaptive filter 220 as shown in FIG. 2 is replaced by other components which may include: Fast Fourier Transform (FFT) modules 305a and 305b, a Similarity Measure and Delay Estimation Module 310, a Statistical Echo Validation Module 315, and an Echo Parameter Estimation Module 320. While the diagram shows the Echo Parameter Estimation Module 320, the Statistical Echo Validation Module 315, and the Similarity Measure and Delay Estimation Module 310 as being grouped together into single module 306, this is done for clarity and they do not have to be grouped together as such. All operations in the present invention are performed in the Frequency Domain by using a Fast Fourier Transform (FFT) module 305a, 305b, to convert the signal instead of the time domain as was previously used in FIG. 2.

The Similarity Measure and Delay Estimation Module 310 utilizes a similarity measure which performs fewer operations than a classical NLMS algorithm. This is instead of the extensive multiplications and additions per sample it will take to use an NLMS adaptive filter in order to be able to handle more than a 1 s delay, as in FIG. 2.

Echo delay may refer to the time it takes the transmitted signal to reappear in the received signal. The estimation of the delay is performed using an algorithm that can detect an echo with a delay greater than 1 s and allows the capability of the system to perform echo cancellation on many full-duplex calls on a single computer. In order to recognize an echo, in at least one embodiment, the most recent frames of the far-end signal in the Frequency Domain are kept. These frames, represented by N, with N=100 may represent a block of audio signal of about 1.5 s. The most recent frames of the near-end signal represented in the Frequency Domain are kept. These frames, represented by K, with K=5, may represent a block of audio signal of about 80 milliseconds (ms). N−K comparisons between K most recent frames from the near-end and the far-end signal are examined as follows:

$$\text{Diff}(i)=\Sigma_{m=1}^{m+k}|\text{NearEnd}(m)-\text{FarEnd}(m+i)| \text{ with } i=1,\ldots,N-K$$

If Diff(i) is less than a threshold for i=I, then an echo is present, where i represents an index that varies from 1 to N−K, and where m also represents an index used in the summation.

Figure 4:
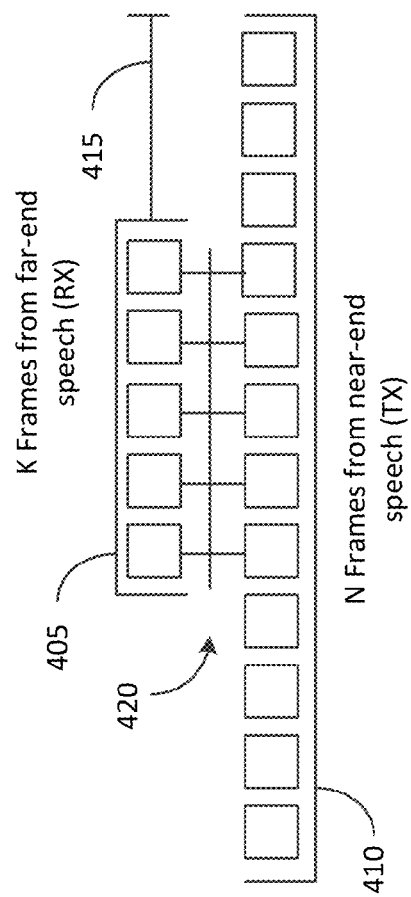
FIG. 4 is a diagram illustrating an embodiment of similarity measure.

FIG. 4 is a diagram illustrating an embodiment of similarity measure, indicated generally at 400. The echo tracking behavior and window may be dynamically determined based on observed echo drift and latency corrections by means of a statistical model. In cases where the delay is not known, in at least one embodiment, the search may span N frames 410. In a non-limiting example, let N be 100 frames, which may comprise about 1.5 s of signal. Once the echo delay 415 is known, in order to reduce processing, the area around the delay is searched instead of the entire original N frames. Assuming that D represents the echo delay, the restricted search area is reduced to: [D−M, . . . , D+M] where M defines the search interval and equals 10. This comprises about 160 ms of signal. In at least one embodiment, it is assumed that once the echo delay is found, its value can vary in an interval of ±160 ms. Computational load may thus be reduced by a factor of three.

The processes of similarity measure and the reduction of search area are performed in the frequency domain so that each searched element may represent a Normalized Amplitude Frequency Vector. It should be noted that given sample values contained in this disclosure are specific to a particular implementation that works on signals with a sampling rate of 8 kHz used in telephony. These values would be adjusted for other sampling rates. In at least one embodiment, the Normalized Amplitude Frequency Vector may be represented in 128 bins. The differences 420 between the K frames from far-end speech (RX) 405, where RX is the far-end signal mixed with echo, and the N frames from near-end speech (TX) 410 are measured and summed. For each frame, as represented by j, the difference equation can be defined as $D_j$ with:

$$D_j=\Sigma_{k+1}^{k+128}|X_j(k)-Y_j(k)|$$

Where $X_j(k)$ and $Y_j(k)$ are respectively the amplitude values in bin K for the near-end signal X and the Far-end signal Y for frame j. Without loss of generality this equation can be re-written as:

$$D_j=\Sigma_{n=1,33,65,97}\Sigma_{k=n}^{k=n+32}|X_j(k)-Y_j(k)|$$

In this second equation the value of $D_j$ is the same as in the first equation except that the sum has been portioned into smaller elements. These partials sum may be represented by the equation:

$$D_{j,n}=\Sigma_{k=n}^{k=n+32}|X_j(k)-Y_j(k)|$$

Different numbers of elements may exist in different embodiments; however 32 increments are used in this instance. The partial sum as described above which ranges from n to n+32 instead of the sum described in the first equation that ranges from 1 to 128, may be used in at least one embodiment.

In at least one embodiment, the similarity measure S may be computed every 4 frames by accumulating the partial sum:

$$S=\Sigma_{n=1,33,65,97}D_{j,n}$$

The similarity measure that is used for calculating the delay is then updated every 4 frames, for example. This small delay may allow for the reduction of computational load by a factor of 4 because 32 subtractions are made each time instead of 128.

In one embodiment, the size of the band may be 32 with a total of 4 bands, for a value of 128. The band size may be altered so that 16 bands may be chosen with a size of 8 for the same total value of 128. Depending on the type of echo observed in a network, the spectral bands may overlap. The size of each band may increase or decrease based on the desired system performance. Bands do not necessarily have to be adjacent. Strides may also be used, such as every N-th band, for example. This is illustrated in the following equations:

$$D_j=\Sigma_{n=0}^{N-1}\Sigma_{k=0}^{128/N}[X_j(kN+n)-Y_j(kN+n)]$$

$$D_{j,n}=\Sigma_{k=0}^{128/N}[X_j(kN+n)-Y_j(kN+n)]$$

Figure 5:
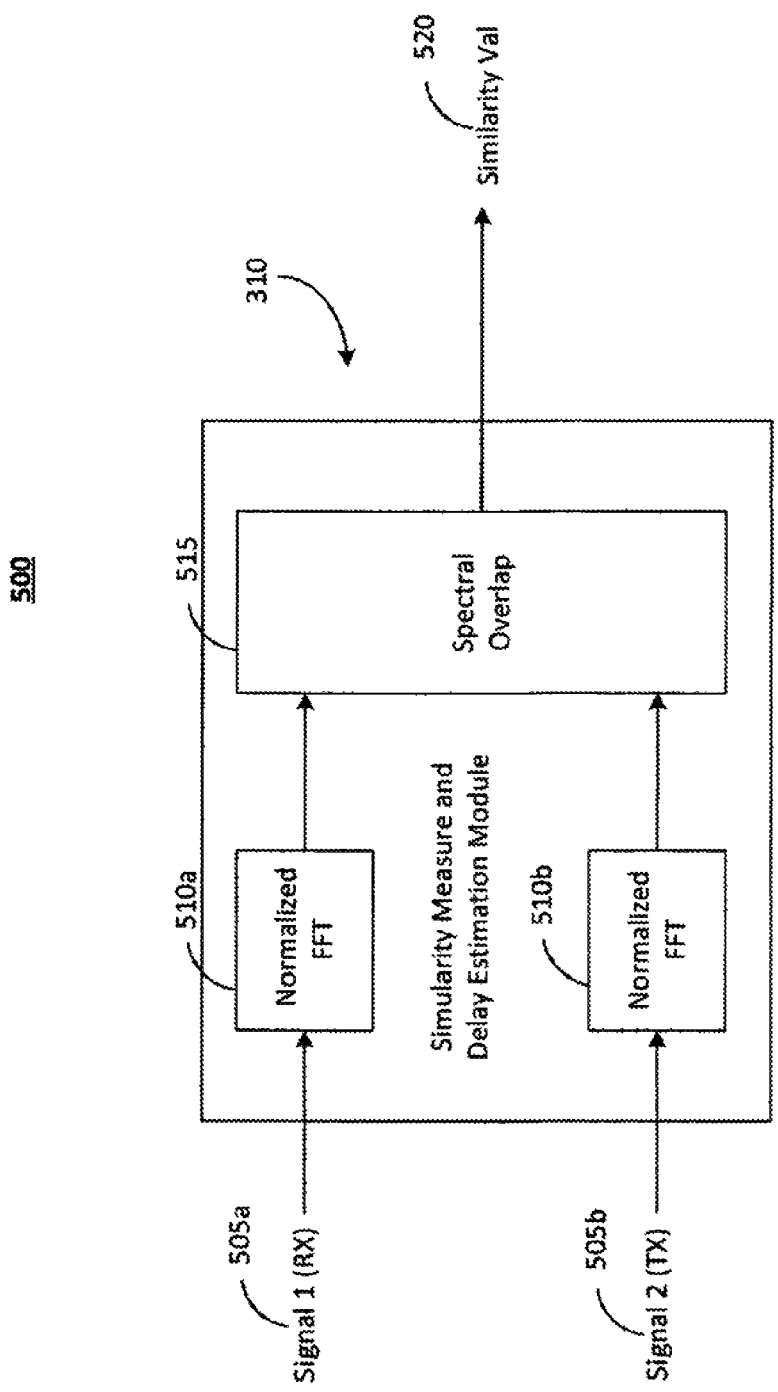
FIG. 5 is a diagram illustrating an embodiment of the components of a similarity module.

FIG. 5 is a diagram illustrating an embodiment of the components of a Similarity Module 310 from FIG. 3, indicated generally at 500. The Similarity Module may transform the RX 505a and the TX 505b signals into the frequency domain. In at least one embodiment, the transformation is performed using a 128 bin FFT. The two spectra are normalized (i.e., the sum of the components of both spectral vectors is made equal to 1) 510a, 510b, in instances where their signal levels are different. When there is no double talk present, the energy of the TX signal is greater than the energy of the RX signal. Band pass filtering is performed to eliminate any spectral regions in the signal that are not desired in the similarity calculation 515. The similarity value 520 is then output from the module. In at least one embodiment, the similarity value, or measure, 520 is defined as the distance between two spectral vectors (e.g., 128 bin) averaged over five RX and TX frames. A value of less than 0.6, where 0.6 is a fixed threshold, may indicate echo, in at least one embodiment.

The similarity module may report existence of echo for frames k, k+2, k+5 because diff(i) is less than a certain threshold for these frames. The similarity module may also report if there is no echo for frames: k+1, k+3, k+4 because diff(i) is greater than the threshold for those frames.

These oscillations may not be considered echo. In order to validate the presence of echo, the statistical approach in the statistical echo validation model 315 may be based on the following assumption in at least one embodiment: there is an echo if for N consecutives estimated delays given by the "Similarity Measure and Echo Delay Estimation" module K if these N delays have exactly the same value with the ratio K/N greater than 75%.

Figure 6:
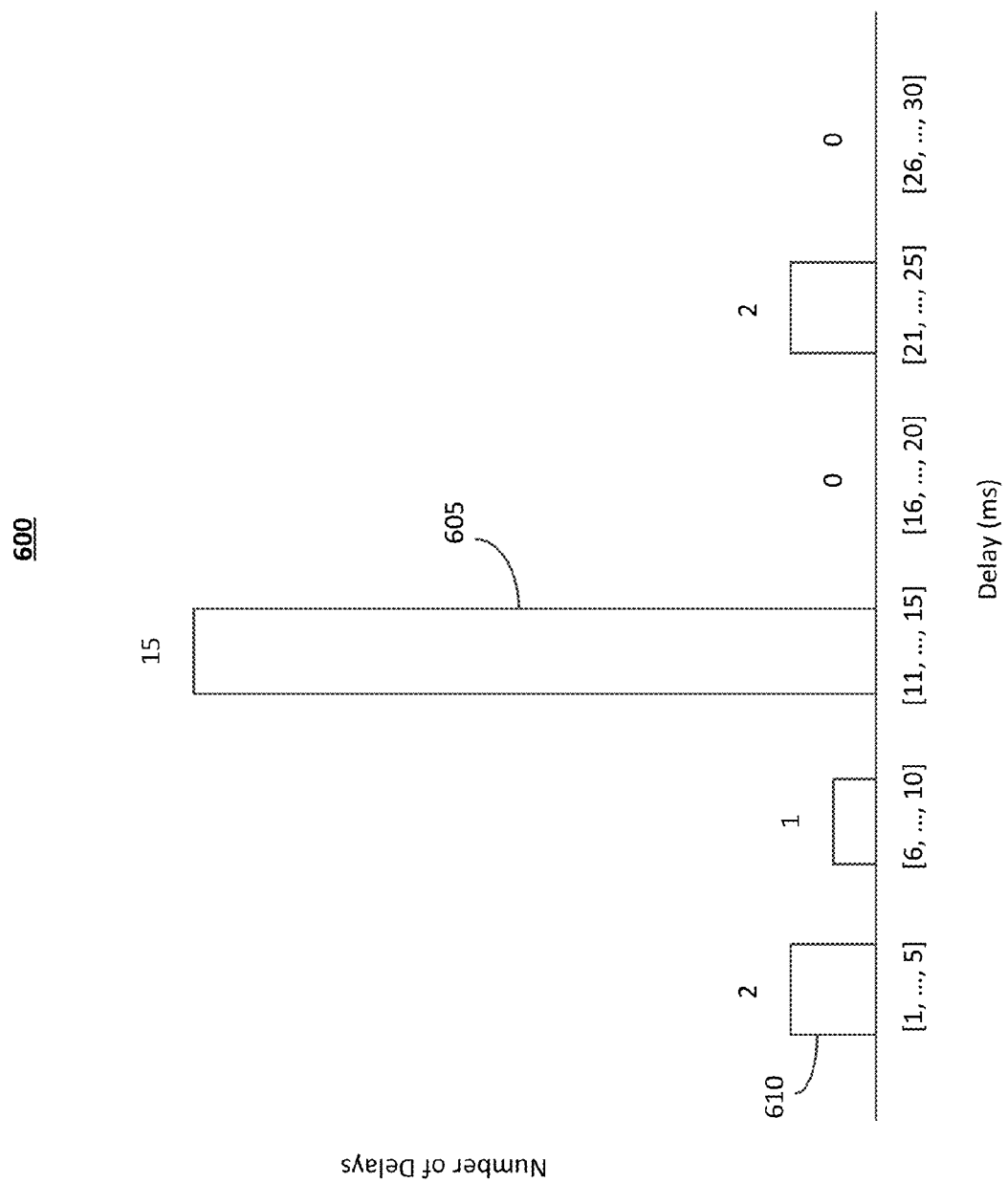
FIG. 6 is an embodiment of a histogram.

A histogram is analyzed to extract the most likely hypothesis from the current data and provides a more accurate estimation of the model parameters. With the approach described herein, the echo delay may be determined in individual frequency bands or groups of bands instead of just the average delay by keeping a histogram for each band or groups of bands. By analyzing the histogram for multi-modal distributions, multiple echoes can be extracted and successfully removed. Time varying echoes may also be handled provided the history values are chosen to track the change in filter parameters. In one embodiment, the statistics of the model parameters are stored in a circular buffer for the 20 most recent frames (320 ms) with the oldest values being removed as the most recent data becomes available. In FIG. 6, an example histogram of delay distribution is provided. The histogram illustrates the distribution of 20 estimated delays and the process by which it is decided if echo is present. This histogram is provided as an example and is not intended to be limiting. Because 15 out of 20 delays 605 are found to be between 11 and 15 ms, the received signal may contain an echo with a delay of 12.5 ms. Similarly, in one embodiment, it may be determined that there is no echo or the echo is no longer present in the RX signal if less than 6 of the 20 estimated delays fall into the same bin. For example, 2 out of the 20 delays are found to be between 1 and 5 ms, 610. This may indicate that there is no echo or echo is no longer present.

In at least one embodiment, the nature of the filtering to be applied to the far-end signal needs to be defined so that it may resemble the echo present in the signal. The filter may be a model of the speaker, microphone, and the room's acoustical attributes. Because the system operates in the Frequency domain, echo parameters may be retained to simulate the filter characteristics during echo parameter estimation 320 (FIG. 3).

Echo return loss may be described as the ratio between the transmitted signal (TX) level and the echo level present in the received signal (RX). It is expressed in Decibel (dB). Knowing the echo return loss per Frequency Bins allows for properly weighting the near-end signal (TX) for echo removal to make it similar to the echo, the normalized transfer function must also be evaluated in the frequency domain.

The filter used to modify the signal in order to obtain a reasonable estimate of the echo is characterized by the echo return loss and the normalized transfer function in at least one embodiment. The FFT of the far-end signal for frame number k may be represented by Y, the echo return loss by ERL, and the Normalized Transfer function between the far-end and the near-end signal by $\hat{H}$. Using digital signal processing, the ERL is evaluated in dB that is represented by:

$$ERL = 20 \log 10 (X_k/Y_k)$$

Where X is the FFT of the near-end signal. The modified, or filtered, far-end signal may thus be given by the equation:

$$\hat{Y}_k = Y_k * \hat{H} * 10^{\left(\frac{ERL}{20}\right)}$$

If the delay D is taken into account, the output U may be represented as:

$$U_k = X_k - \hat{Y}_{k-D}$$

The time domain signal u is obtained by inverse Fast Fourier Transform (IFFT) 325:

$$u = \text{IFFT}(U)$$

This operation results in a signal block of 256 samples which is overlapped and added to the previous block to form the output signal.

FIG. 3 additionally illustrates speech detection modules as applied to at least one embodiment of the echo canceller 300. This application must be performed before it can be determined whether to evaluate different echo parameters. Three speech detectors are illustrated in FIG. 3: the RX speech detector 330, the TX speech detector 335, and the double talk detector 340. Speech detection is based on the variability in the spectrum of consecutive frames and the estimated signal power. Detectors are generally designed around the principle that if the signal level is greater than a certain threshold, then it is reasonable to assume that speech is present. Combining the signal level with variation in the spectrum over multiple frames allows for greater accuracy and robustness in the system.

The RX speech detector 330 does not differentiate between echo and the far-end speaker. RX speech 345 may mean that the far-end speaker is talking or that an echo is present. Because the level of echo may be relatively low, the RX speech detector 330 may be more sensitive than the other two speech detectors. If RX speech 345 is present, it may be assumed that the far-end speech level is greater than the far-end speech threshold or that the far-end speech spectral variation is greater than the spectral variation threshold. The value of these thresholds must be chosen such that the speech detector triggers on low echoes while minimizing false triggers on background noise. If the thresholds are too small, the background noise picked by the microphone may result in false detection. If the threshold value is too large, part of the speech or part of the echo may not be detected.

The TX speech detector 335 may perform a search for the presence of echo. The search may be triggered by activity of the near-end speaker. If near-end speech (TX) 350 is present, it may be assumed that the near-end speech level is greater than the near-end speech threshold or that the near-end speech spectral variation is greater than the spectral variation threshold. The thresholds may have higher values than those for far-end speech.

The double-talk detector 340 may determine if both far-end and near-end speech is present. Accurate detection of double talk in the presence of echo is necessary so that the parameters do not change based on a similarity calculation that is no longer expected to be valid. Double talk detection allows for controlling the amount of echo removed when speech is present, in at least one embodiment. A 3 dB signal over the echo is normally considered as an indicator of double talk. It is assumed that double talk is present if far-end speech is present, near-end speech is present, and the level of far-end speech is greater than the echo level in addition to 3 dB.

The similarity measure is also added within the system to measure the similarity between TX and RX with the appropriate delay to account for situations where an echo may be louder and thus decreasing the reliability of detection. For example, two distinct echo levels may present in a conference call such as when the first speaker is talking. Speaker 1 may talk louder, thus they may have a high echo level. Speaker 2 may talk lower and thus having the lower voice may result in a lower echo level than Speaker 1 may have. The similarity value, in the presence of double talk, is thus higher than in the case where there is only an echo. In at least one embodiment, a hysteresis in similarity values between 0.65 and 0.85 is used to verify double talk in addition to the 3 dB constraint.

Figure 7:
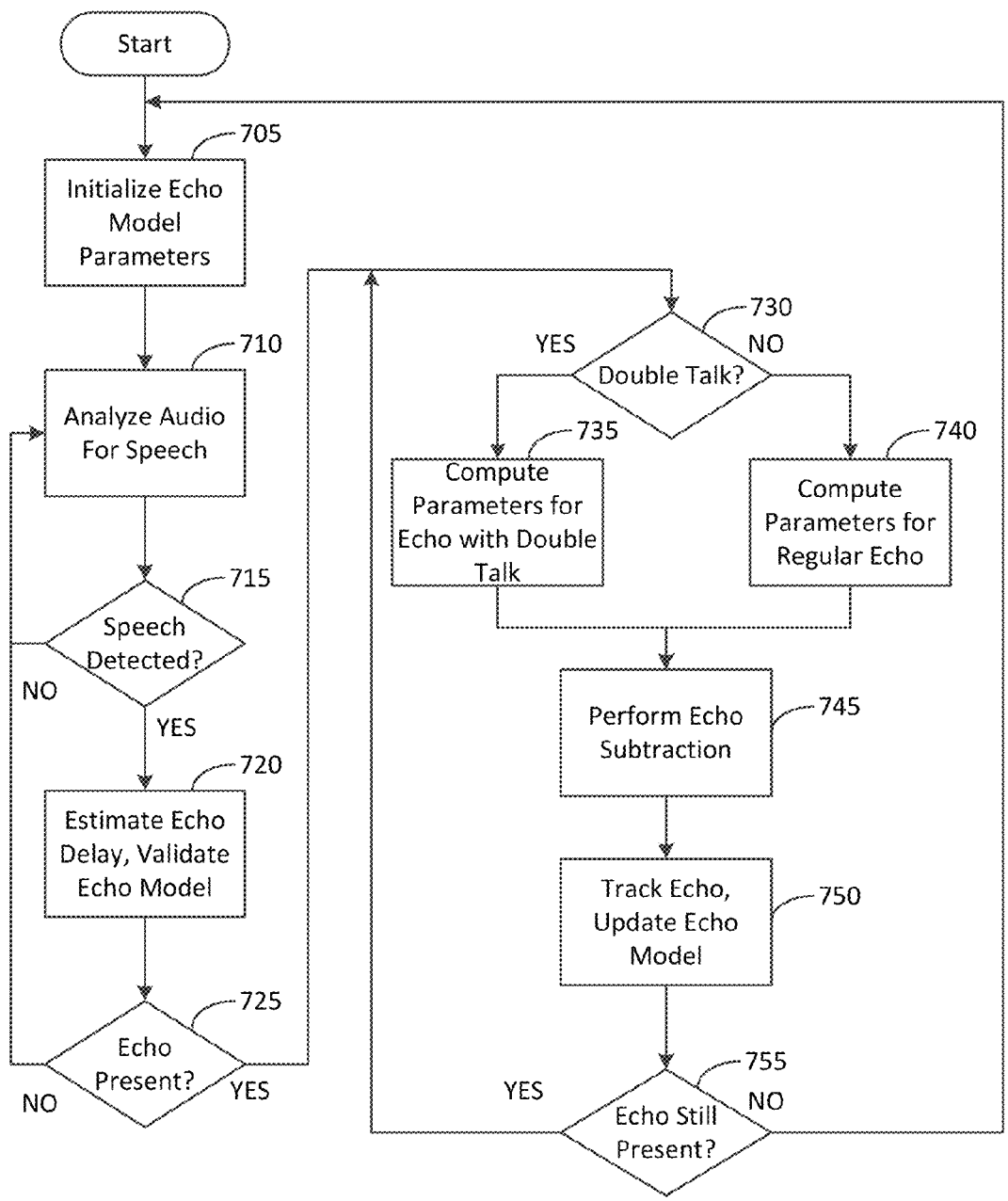
FIG. 7 is a flowchart illustrating an embodiment of the echo cancellation process.

As illustrated in FIG. 7, an embodiment of a process 700 for echo cancellation is provided, indicated generally at 700. The process may be operative on any or all elements of the system 300 (FIG. 3). Echo Cancellation itself may be defined as a subtraction in the frequency domain between the near-end signal and the estimated echo as:

$$U = X - \hat{Y}$$

With $$\hat{Y} = Y * \hat{H} * 10^{(\frac{ERL}{20})}$$

In step 705, the echo model parameters are initialized. For example, initialization may be triggered by the signal being transformed from the time domain to the frequency domain using FFT. Control is passed to step 710 and the process 700 continues.

In step 710, the audio is analyzed for presence of speech. Control is passed to step 715 and process 700 continues.

In step 715, it is determined whether or not speech is detected. If it is determined that speech is detected, then control is passed to step 720 and process 700 continues. If it is determined that speech is not detected, then control is passed back to step 710 and process 700 continues.

The determination in step 715 may be made based on any suitable criteria. For example, speech detection is performed by TX speech detectors, RX speech detectors, and double talk detectors (as described above in FIG. 3). Detectors are generally designed around the principle that if the signal level is greater than a certain threshold, then it is reasonable to assume that speech is present. The value of these thresholds must be carefully chosen from analysis of data collected from typical use cases of the echo canceller. If the thresholds are too small, the background noise picked up by the microphone may result in false detection. If the threshold value is too large, part of the speech or part of the echo may not be detected. If near-end speech is present, it may be assumed that the near-end speech level is greater than the near-end speech threshold or that the near-end speech spectral variation is greater than the spectral variation threshold. If far-end speech is present, it may be assumed that the far-end speech level is greater than the far-end speech threshold or that the far-end speech spectral variation is greater than the spectral variation threshold. The thresholds may have higher values than those for near-end speech.

In step 720, the echo delay is estimated and the echo model is validated. For example, the algorithm as described above is used to estimate delay. Validation of the echo model is statistical and may be based on the assumption that there is an echo if for N consecutives estimated delays given by the "Similarity Measure and Echo Delay Estimation" module K of these N delays have exactly the same value with the ratio K/N greater than 75%. Control is passed to step 725 and process 700 continues.

In step 725, it is determined whether or not echo is present. If it is determined that echo is detected, then control is passed to step 730 and process 700 continues. If it is determined that echo is not detected, then control is passed back to step 710 and process 700 continues.

The determination in step 725 may be made based on any suitable criteria. For example, the algorithms as described above may be used to determine whether or not echo is detected along with statistical analysis as described above.

In step 730, it is determined whether or not double talk is present. If it is determined that double talk is present, then control is passed to step 735 and process 700 continues. If it is determined that double talk is not detected, then control is passed to step 740 and process 700 continues.

The determination in step 730 may be made based on any suitable criteria. For example, during double talk, in order to avoid any degradation in the signal when the far-end person is speaking, the estimated echo $\hat{Y}$ may be multiplied by an attenuation factor $\alpha$ with $0<\alpha<1$, the output is then defined by:

$$U = X - \alpha * \hat{Y}$$

The constant $\alpha$ may control the amount of echo that is removed during double-talk. If $\alpha=0$ no echo is removed at all during double-talk, which is in general the case during double-talk in most systems. A system value of $\alpha=0.5$ during double-talk and 1 at other times allows for better control over the system. In at least one embodiment, a 3 dB signal level above the echo level is considered as an indicator for double talk. It is assumed that double talk is present if far-end speech is present, near-end speech is present, and the level of far-end speech is greater than the echo level +3 dB. A reason for changing the amount of echo removed during double talk is to avoid or reduce audible artifacts in the signal after echo removal.

In step 735, parameters are computed for echo in the presence of double talk. Control is then passed to step 745 and process 700 continues.

In step 740, parameters are computed for echo in the absence of double talk. Control is then passed to step 745 and process 700 continues.

In step 745, echo subtraction is performed. Once the delay has been accurately determined, the echo is cancelled by applying a transfer function on the RX signal. The transfer function is a ratio of the TX and RX signals in the frequency (spectral) domain and can be represented as (TX/RX).

This ratio is obtained from a histogram by choosing the one corresponding to the most probable value of the delay. FIG. 6 is an embodiment of a histogram, indicated generally at 600. In at least one embodiment, echo cancellation is performed in the frequency domain using a statistical approach that is more effective for long delays and multiple echoes. Performance in the frequency domain eliminates the need for adaptive filtering utilizing extensive computations to calculate filter coefficients and other non-linear operations to completely remove the echo in addition to a settling time for convergence of filter coefficients. Control is passed to step 750 and process 700 continues.

In step 750, the echo is tracked and the echo model is updated. Control is passed to step 755 and process 700 continues.

In step 755, it is determined whether or not echo is still present. If it is determined that echo is still present, then control is passed back to step 730 and process 700 continues.

If it is determined that echo is not present, then control is passed back to step 705 and process 700 continues.

The determination in step 755 may be made based on any suitable criteria, such as the methods as described above. As control is passed back to step 705, the parameters are reset in the echo model and the process continues.

In at least one embodiment, echo cancellation is needed in interactive voice response (IVR) systems that utilize automatic speech recognition (ASR). In order to prevent an echo from the prompt being played to the caller from triggering the speech detector in the ASR engine, echo cancellation plays an important role. If echo is present, it would result in repeated false barge-ins and thus a poor user experience. Such echo, if not cancelled, can be perceived by the system as a response from a user which can trigger a false interaction.

Figure 8:
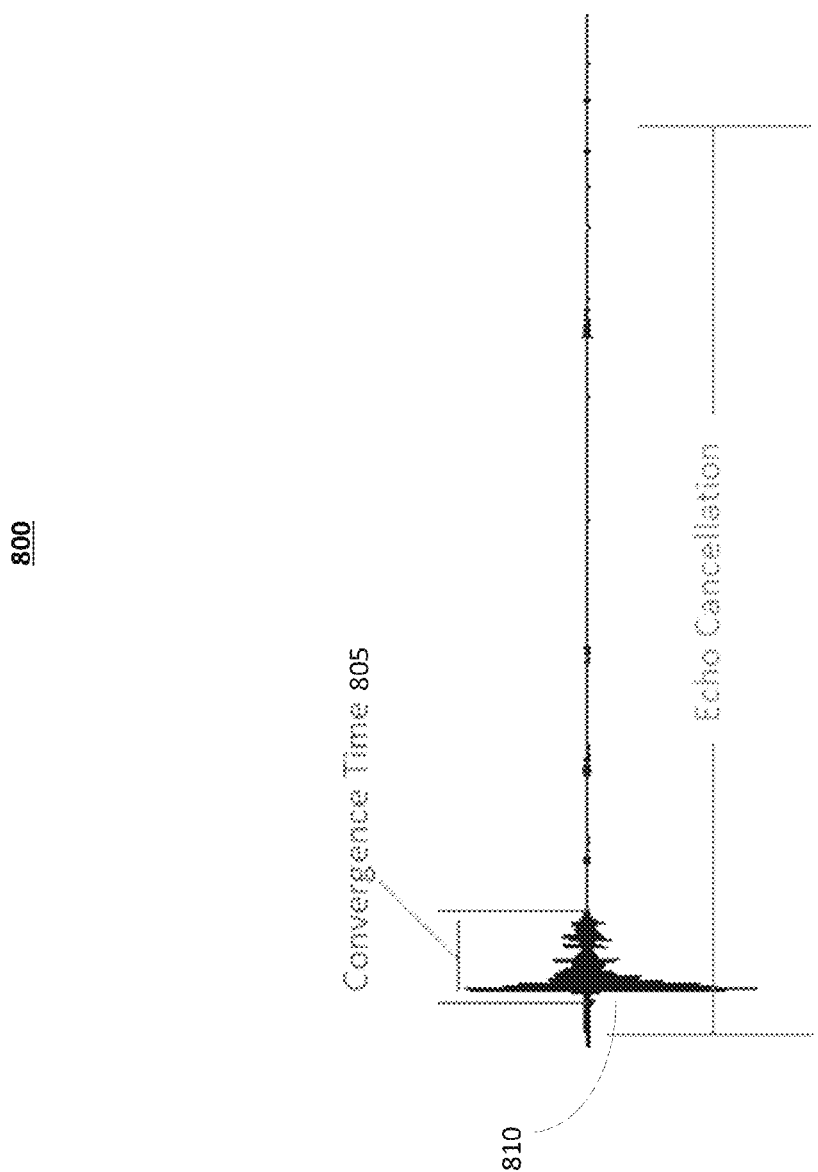
FIG. 8 is an illustration of an embodiment of convergence time.

FIG. 8 is an illustration of an embodiment of the convergence time 805 in an echo canceller, indicated generally at 800. Because, during convergence the level of the echo signal 810 is still relatively high, this can trigger the ASR engine's speech detector, confusing the echo with an answer from a user. To prevent this from happening, in one embodiment the output of the echo canceller is delayed by the expected number of frames required to detect the presence of echo (convergence time). If an echo is detected, the echo is removed retroactively from the buffered frames, which are then output to the ASR engine. As the convergence time in the present invention is short, the introduced delay does not noticeably impair the user experience of the voice dialog. To further reduce the perception of delay, at least one embodiment stops the prompts ("bargein") based on a speech activity signal derived by the present invention from state information of the echo canceller instead of information from the speech detector in the ASR engine. In another embodiment, the buffers from which the echo was removed retroactively may be fed to the downstream consumer (such as an ASR engine) faster than real-time to reduce or eliminate the delay for subsequent speech frames.

Figure 9:
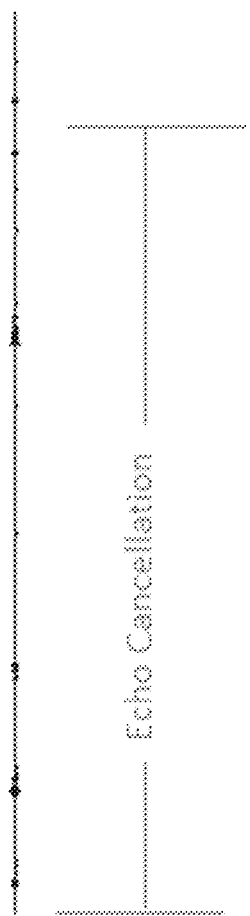
FIG. 9 is an illustration of an embodiment of echo cancellation with low to no convergence time.

FIG. 9 is an example illustration of an embodiment of echo cancellation with low to no convergence time, indicated generally at 900. The entire output may become more uniform as shown. In at least one embodiment, the value of T reflecting the convergence time is equal to 150 ms.

Figure 10:
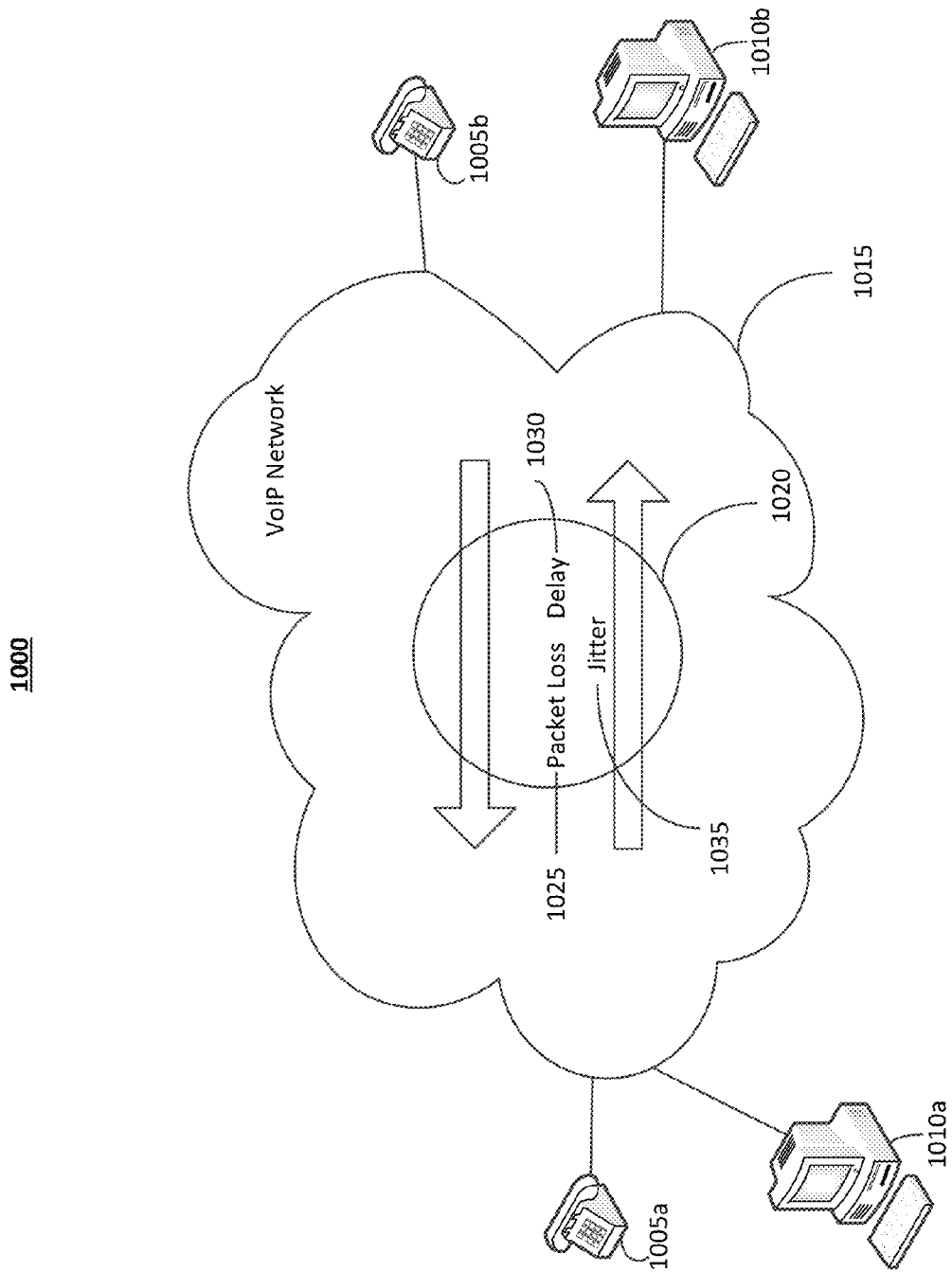
FIG. 10 is a diagram illustrating an embodiment of echo over a VoIP network.

In at least one embodiment, acoustic echo over a PSTN network would generally not show a delay greater than 500 ms. However, in VoIP networks, the delays can be greater than that. FIG. 10 illustrates an embodiment of echo over a VoIP network, indicated generally at 1000, and communication between two telephones 1005*a*, 1005*b*. The audio signal passes through the network 1015 to travel between Telephone 1005*a* and Telephone 1005*b*. The network 1015 may also be connected to other devices, such as, but not limited to, a computer 1010*a*, 1010*b*. Other examples of devices may include servers, fax machines, etc. The network introduces its own disturbances 1020 to the audio such as packet loss 1025, delay 1030, and jitter 1035.

Delay 1030 specifies the amount of time it may take for a bit of data to travel across the network from one point to another. Several other known sources of delays may include: processing delay, queuing delay, transmission delay, and propagation delay. Processing delay may be the time routers take to process the packet. Queuing delay may be the time the packet spends in routing queues. Transmission delay may be the time it takes to push the packet onto the link. Propagation delay may include the time for a signal to reach its destination. The sum of all these delays, which represents the total delay, may be added to the real echo delay to form the final echo delay over the network. The total delay encountered may easily exceed 1 s. The present invention can handle delays much greater than 1 s.

Another disturbance introduced by the Network 1015 is caused by Jitter 1035. In at least one embodiment, the Jitter 1035 measures variation in latency over the Network which can introduce substantial variation in the delay seen by the echo canceller algorithm. These sudden variations in the delay introduced by the Jitter 1035 are difficult to handle and can temporally cause the algorithm to lose track of the echo. The search interval mechanism for echo delay allows for the handling of echo with very long delay as well as the restricted search that compensates for the effect of the Jitter 1035 after the echo was found. If echo is found, then a search for echo may occur over an interval of ±250 ms. If the Jitter 1035 or variation in latency over the Network 1015 is greater than ±250 ms, the search for the echo delay will start over in the interval of 1.5 s.

Another common signal degradation introduced by the Network is packet loss 1030. Packet Loss 1030 may occur when one or more packets of data traveling across the Network 1015 fail to reach their destination. Packet Loss 1030 can be caused by a number of factors such as signal degradation over the network due to multi-path fading, packet drop because of channel congestion, or corrupt packets rejected in-transit.

In order to handle packet loss 1030, the echo detection process needs to be robust and cannot rely solely on a simple similarity measure. In at least one embodiment, the use of statistics via the histogram method makes the system robust to packet loss as the decision making is performed based on information that is accumulated over several frames of data. A few frames in the search window that may be affected by packet-loss will typically not change the statistics to the point where the system loses track of the echo.

In at least one embodiment, the similarity and model parameters calculation at different histories make use of previous partial values for overlapping frames at earlier instants. A precise value of the delay is calculated only if an echo is present. Once an echo has been determined and the echo characteristics don't change over time, the calculations needed for delay determination are not repeated although echo cancellation still needs to be performed with the locked delay estimate. If the echo characteristics change over time, the EC unlocks the delay estimates and a fresh round of model parameters are evaluated. Disappearance of an echo will cause a reset of the model parameters and the echo canceller will automatically reduce the number of operations. These optimizations considerably reduce the number of computational operations performed by the EC.

In other embodiments, if multiple echoes are present in the received signal (RX) the delay histogram has multiple peaks. Estimates for the separate echoes may be made and they can be subtracted in sequence in the same way. Overlap of echo bands may need the separate transfer functions to be merged to avoid distortion of one echo cancellation with the other.

In at least one embodiment, the similarity calculation can be optimized by focusing on bands of interest if the near-end and far-end signals have spectral density concentrated in specific regions. This significantly reduces computational overhead because of the highly repetitive nature of the similarity calculation over the entire far-end channel, an aspect that can become very important when searches for long delays are made.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A system for cancellation of acoustic echo comprising:
   a. a source of audio input, wherein the source of audio input generates an audio signal;
   b. a network, wherein the network is connected to the source and to an echo cancellation module, wherein the network transmits said audio signal from the source to the echo cancellation module; and
   c. the echo cancellation module, wherein the module:
      i. converts the audio signal into a frequency domain,
      ii. performs similarity measure on the converted audio signal,
      iii. performs delay estimation mathematically using an expression for similarity measure on the converted audio signal, wherein the expression for similarity measure comprises the mathematical expression:

$$Diff(i) = \sum_{m=1}^{m=K} |NearEnd(m) - FarEnd(m+i)| \text{ with}$$

$$i = 1, \ldots, N-K$$

wherein i represents a variable index from 1 to (N–K), m represents a summation index, N represents frames in a near-end speech signal, and K represents frames in a far end speech signal,
      iv. performs echo parameter estimation for a validation model,
      v. performs statistical echo validation on the converted audio signal using the validation model,
      vi. detects speech in the converted audio signal, and
      vii. detects double-talk in the converted audio signal.

2. The system of claim 1, wherein said source of audio input comprises a receiver.

3. The system of claim 1, wherein the echo cancellation module applies Fast Fourier Transform to convert the audio signal into the frequency domain.

4. The system of claim 1, wherein performing similarity measure further comprises one or more of:
   a. transforming signals into the frequency domain, wherein the transforming comprises Fast Fourier Transform;
   b. normalizing spectra; and
   c. performing band pass filtering.

5. The Fast Fourier Transform of claim 4, wherein said Fast Fourier Transform operates using 128 bins.

6. The system of claim 1, wherein performing delay estimation comprises examining and comparing recent frames from a first signal and a second signal.

7. The system of claim 6, wherein said first signal comprises a near-end signal and said second signal comprises a far-end signal.

8. The system of claim 1, wherein performing echo parameter estimation comprises utilizing a histogram.

9. The system of claim 1, wherein detecting speech comprises variability based at least in part on a spectrum of consecutive frames and an estimated signal power.

10. The system of claim 1, wherein detecting double talk further comprises:
    a. controlling an amount of echo removed when speech is present;
    b. determining a presence of far-end and near-end speech; and
    c. analyzing similarity measure.

11. A method for acoustic echo cancellation comprising the steps of:
    a. initializing echo model parameters;
    b. analyzing an audio signal for speech;
    c. determining if speech has been detected in said audio signal, wherein if speech has not been detected in said audio signal, continuing to analyze said audio for speech;
    d. estimating echo delay in said audio signal and validating an echo model for said audio signal if speech has been detected in said audio signal, wherein the estimating echo delay and validating an echo model further comprises:
       i. measuring and summing a distance for each frame of the audio;
       ii. estimating the echo delay mathematically using the mathematical expression for similarity measure, wherein the mathematical expression comprises:

$$Diff(i) = \sum_{m=1}^{m=K} |NearEnd(m) - FarEnd(m+i)| \text{ with}$$

$$i = 1, \ldots, N-K$$

wherein i represents a variable index from 1 to (N–K), m represents a summation index, N represents frames in a near-end speech signal, and K represents frames in a far end speech signal; and,
       iii. validating the estimate using a statistical model;
    e. detecting the presence of echo in said audio signal;
    f. determining if double talk is present in said audio signal, wherein if double talk is present in said audio signal, determining parameters for echo with double talk and wherein if double talk is not present, computing default parameters for echo;
    g. performing echo subtraction on said audio signal; and
    h. tracking echo in said audio signal and updating said echo model.

12. The method of claim 11, wherein the step of initializing of echo model parameters is triggered by a transformation of an audio signal.

13. The method of claim 12, wherein the transformation occurs from the time domain to the frequency domain.

14. The method of claim 13, wherein the transformation is performed using Fast Fourier Transform.

15. The method of claim 11, wherein the step of analyzing the audio signal for speech further comprises the step of determining whether a signal level in the audio signal meets a threshold.

16. The method of claim 15, further comprising determining speech is present if the signal level in the audio signal is greater than the threshold.

17. The method of claim 11, wherein the step of analyzing audio for speech further comprises the step of analyzing variability in a spectrum of consecutive frames and an estimated signal power.

18. The method of claim 11, wherein the step of determining if speech has been detected is performed by one or more of: near-end speech detector, far-end speech detector, and double talk detector.

19. The method of claim 11, wherein the step of detecting the presence of echo further comprises determining that echo is present if a measure of similarity meets a threshold.

20. The method of claim 11, wherein the step of determining if double talk is present further comprises the step of determining that a signal level above an echo level is present, near-end speech is present, and far-end speech is present.

21. The signal level of claim 20, wherein the signal level is 3 dB.

22. The method of claim 11, wherein the step of performing echo subtraction further comprises the step of applying a transfer function to a far-end signal.

23. The method of claim 22, wherein the transfer function is determined by a function of a ratio of a near-end signal and the far-end signal in a spectral domain and analyzing a histogram.

24. The method of claim 23, wherein the analyzing a histogram comprises the steps of:
a. storing statistics of model parameters in a circular buffer for a number of frames;
b. determining an echo delay using frequency bands;
c. analyzing said histogram for multimodal distributions; and
d. extracting echo where there is multimodal distribution present.

25. The method of claim 11 wherein said method is applied in interactive voice response systems utilizing automatic speech recognition.

26. The method of claim 11, wherein detecting the presence of echo in step (e), further comprises the step of removing said echo retroactively from buffered frames.

27. The method of claim 11, wherein said method is performed in a VoIP network.

28. The method of claim 11, wherein estimates for multiple echoes are made and subtracted.

29. A system for the cancellation of acoustic echo over communication networks comprising:
a. a source of audio input, wherein the source of audio input generates an audio signal;
b. a network, wherein the network is connected to the source and to an echo cancellation module, wherein the network transmits said audio signal from the source to the echo cancellation module; and
c. the echo cancellation module, wherein the module:
  i. converts the audio signal from a time domain into a frequency domain,
  ii. performs one or more of: similarity measure on the converted audio signal, delay estimation mathematically using an expression for similarity measure on the converted audio signal, echo parameter estimation for a validation model, and statistical echo validation on the converted audio signal using the validation model, as required by said echo cancellation module, wherein the expression for similarity measure comprises the mathematical expression:

$$Diff(i) = \sum_{m=1}^{m=K} |NearEnd(m) - FarEnd(m+i)| \text{ with } i = 1, \ldots, N-K$$

wherein i represents a variable index from 1 to (N−K), m represents a summation index, N represents frames in a near-end speech signal, and K represents frames in a far end speech signal;
  iii. detects speech in the converted audio signal, and
  iv. detects double-talk in the converted audio signal.

30. The system of claim 29, wherein said source of audio input comprises a receiver.

31. The system of claim 29, wherein the echo cancellation module applies Fast Fourier Transform to convert the audio signal from the time domain into the frequency domain.

32. The system of claim 29, wherein performing similarity measure further comprises one or more of:
a. transforming signals into the frequency domain, wherein the transforming comprises Fast Fourier Transform;
b. normalizing spectra; and
c. performing band pass filtering.

33. The Fast Fourier Transform of claim 32, wherein said Fast Fourier Transform operates using 128 bins.

34. The system of claim 29, wherein performing delay estimation comprises examining and comparing recent frames from a first signal and a second signal.

35. The system of claim 34, wherein said first signal comprises a near-end signal and said second signal comprises a far-end signal.

36. The system of claim 29, wherein performing echo parameter estimation comprises utilizing a histogram.

37. The system of claim 29, wherein detecting speech comprises variability based at least in part on a spectrum of consecutive frames and an estimated signal power.

38. The system of claim 29, wherein detecting double talk further comprises:
a. controlling an amount of echo removed when speech is present;
b. determining a presence of far-end and near-end speech; and
c. analyzing similarity measure.

39. A method for acoustic echo cancellation comprising the steps of:
a. transforming an audio signal;
b. initializing echo model parameters;
c. analyzing said audio signal for speech;
d. detecting a presence of speech in the audio signal;
e. estimating echo delay in the audio signal and validating said echo model for the audio signal comprising the steps of:
  i. measuring and summing a distance for each frame of the audio;
  ii. estimating the echo delay mathematically using an expression for similarity measure, wherein the expression for similarity measure comprises the mathematical expression:

$$Diff(i) = \sum_{m=1}^{m=K} |NearEnd(m) - FarEnd(m+i)| \text{ with } i = 1, \ldots, N-K$$

wherein i represents a variable index from 1 to (N−K), m represents a summation index, N represents frames in a near-end speech signal, and K represents frames in a far end speech signal; and
  iii. validating the estimate using a statistical method;
f. detecting the presence of echo in the audio signal, wherein if the similarity measure meets a threshold, echo is present;

g. detecting the presence of double talk in the audio signal;
h. determining parameters for at least one of: echo with double talk and echo;
i. subtracting the echo from the audio signal;
j. updating said echo model; and
k. determining if the presence of echo is reduced in the audio signal.

40. The method of claim 39, wherein step (k) further comprises the step of repeating the method of claim 39 if echo is determined to be reduced until the presence of echo is undetectable.

41. The method of claim 39, wherein said transforming is performed from the time domain to the frequency domain.

42. The method of claim 41, wherein said transformation is performed using Fast Fourier Transform.

43. The method of claim 39, wherein the step of analyzing the audio signal for speech further comprises the step of determining whether a signal level in the audio signal meets a threshold.

44. The method of claim 43, further comprising determining speech is present if the signal level in the audio signal is greater than the threshold.

45. The method of claim 39, wherein the step of analyzing of audio for speech further comprises the step of analyzing variability in a spectrum of consecutive frames and an estimated signal power.

46. The method of claim 39, wherein the step of detecting a presence of speech is performed by one or more of: near-end speech detector, far-end speech detector, and double talk detector.

47. The method of claim 39, wherein the step of detecting the presence of double talk further comprises the step of determining that a signal level above an echo level is present, near-end speech is present, and far-end speech is present.

48. The signal level of claim 47, wherein the signal level is 3 dB.

49. The method of claim 39, wherein the step of subtracting the echo further comprises the step of applying a transfer function to a far-end signal.

50. The transfer function of claim 49, wherein the transfer function is determined by a function of a ratio of a near-end signal and the far-end signal in a spectral domain and analyzing a histogram.

51. The method of claim 50, wherein the analyzing a histogram comprises the steps of:
    a. storing statistics of model parameters in a circular buffer for a number of frames;
    b. determining an echo delay using frequency bands;
    c. analyzing said histogram for multimodal distributions; and
    d. extracting echo where there is multimodal distribution present.

52. The method of claim 39 wherein said method is applied in interactive voice response systems utilizing automatic speech recognition.

53. The method of claim 39 wherein if echo is determined to be present in step (e), further comprising the step of removing said echo retroactively from buffered frames.

54. The method of claim 39, wherein said method is performed in a VoIP network.

55. The method of claim 39 wherein estimates for multiple echoes are made and subtracted.

* * * * *

UNITED STATES PATENT AND TRADEMARK OFFICE
CERTIFICATE OF CORRECTION

PATENT NO. : 9,628,141 B2
APPLICATION NO. : 14/060141
DATED : April 18, 2017
INVENTOR(S) : Felix Immanuel Wyss et al.

It is certified that error appears in the above-identified patent and that said Letters Patent is hereby corrected as shown below:

In the Claims

In Claim 1, Column 13, Lines 36-39, please correct the phrase "wherein i represents a variable index from 1 to (N-K), m represents a summation index, N represents frames in a near-end speech signal, and K represents frames in a far end speech signal," to read "wherein i represents a variable index from 1 to (N-K), m represents a summation index, N represents frames in a far-end speech signal, and K represents frames in a near-end speech signal";

In Claim 5, Column 13, Line 58, the phrase "The Fast Fourier Transform of claim 4,..." should be corrected to read "The system of claim 4,...";

In Claim 11, Column 14, Lines 36-39, please correct the phrase "wherein i represents a variable index from 1 to (N-K), m represents a summation index, N represents frames in a near-end speech signal, and K represents frames in a far end speech signal," to read "wherein i represents a variable index from 1 to (N-K), m represents a summation index, N represents frames in a far-end speech signal, and K represents frames in a near-end speech signal,";

In Claim 21, Column 15, Line 14, the phrase "The signal level of claim 20,..." should be corrected to read "The method of claim 20,...";

In Claim 29, Column 16, Lines 1-4, please correct the phrase "wherein i represents a variable index from 1 to (N-K), m represents a summation index, N represents frames in a near-end speech signal, and K represents frames in a far end speech signal," to read "wherein i represents a variable index from 1 to (N-K), m represents a summation index, N represents frames in a far-end speech signal, and K represents frames in a near-end speech signal,";

In Claim 33, Column 16, Line 19, the phrase "The Fast Fourier Transform of claim 32,..." should be corrected to read "The system of claim 32,...";

Signed and Sealed this
Thirty-first Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,628,141 B2

In Claim 39, Column 16, Lines 60-63, please correct the phrase "wherein i represents a variable index from 1 to (N-K), m represents a summation index, N represents frames in a near-end speech signal, and K represents frames in a far end speech signal," to read "wherein i represents a variable index from 1 to (N-K), m represents a summation index, N represents frames in a far-end speech signal, and K represents frames in a near-end speech signal,";

In Claim 48, Column 18, Line 4, the phrase "The signal level of claim 47,…" should be corrected to read "The method of claim 47,…";

In Claim 50, Column 18, Line 9, the phrase "The transfer function of claim 49,…" should be corrected to read "The method of claim 49,…".